US007667638B1

(12) United States Patent
Karam (10) Patent No.: US 7,667,638 B1
(45) Date of Patent: Feb. 23, 2010

(54) DETECTION AND RESOLUTION OF CLOSELY SPACED TARGETS IN A MONOPULSE SYSTEM

(75) Inventor: Mostafa Karam, Moorpark, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 12/393,602

(22) Filed: Feb. 26, 2009

(51) Int. Cl.
*G01S 13/44* (2006.01)

(52) U.S. Cl. .................. 342/149; 342/152; 342/194; 342/195; 342/80; 342/91

(58) Field of Classification Search ............... 342/149, 342/152, 80, 91, 194–195
See application file for complete search history.

(56) References Cited

U.S. PATENT DOCUMENTS

| | | | | |
|---|---|---|---|---|
| 3,836,929 | A | * | 9/1974 | White .................. 342/427 |
| 3,935,572 | A | * | 1/1976 | Broniwitz et al. ........... 342/80 |
| 4,005,421 | A | * | 1/1977 | Dax ..................... 342/148 |
| 4,041,487 | A | * | 8/1977 | Evans et al. ............. 342/91 |
| 4,090,197 | A | * | 5/1978 | Cantrell ................ 342/148 |
| 4,646,095 | A | * | 2/1987 | Kanter .................. 342/149 |
| 5,128,683 | A | * | 7/1992 | Freedman et al. .......... 342/158 |
| 5,270,718 | A | * | 12/1993 | DiDomizio .............. 342/147 |
| 5,831,570 | A | * | 11/1998 | Ammar et al. ............ 342/26 B |
| 5,847,673 | A | | 12/1998 | DeBell |
| 6,144,333 | A | | 11/2000 | Cho |
| 6,356,231 | B1 | * | 3/2002 | Zheng et al. ............. 342/149 |
| 6,801,156 | B1 | | 10/2004 | Wasiewicz |
| 7,221,307 | B1 | * | 5/2007 | Friesel ................. 342/13 |
| 7,250,902 | B2 | | 7/2007 | Manoogian et al. |
| 7,330,149 | B2 | | 2/2008 | Weatherford |
| 7,417,584 | B1 | | 8/2008 | Reifler et al. |
| 2009/0096674 | A1 | * | 4/2009 | Karam et al. ............ 342/427 |

OTHER PUBLICATIONS

Karam: Application for patent being filed concurrently on Feb. 26, 2009, for "*Extraction of Relative Signals from Closely Spaced Targets in a Monopulse System*".

* cited by examiner

*Primary Examiner*—John B Sotomayor
(74) *Attorney, Agent, or Firm*—Tarolli, Sundheim, Covell & Tummino LLP (57) ABSTRACT

Systems and methods are provided for determining first and second azimuth angle values representing two closely spaced targets. Monopulse radar scan data is produced and processed to provide quadrature angle data, merged azimuth angle data, and a maximum magnitude of the quadrature angle. A quadrature angle methodology that derives the first and second azimuth angle values from an integration of the quadrature angle data over an angular region within the monopulse scan is applied if the maximum quadrature angle magnitude exceeds the threshold value. A merged azimuth angle methodology that fits the merged azimuth angle data to a polynomial as a function of a boresight angle of the monopulse radar to derive the first and second azimuth angle values is applied if the maximum quadrature angle magnitude does not exceed the threshold value. The first and second azimuth angle values are then displayed to a user.

20 Claims, 6 Drawing Sheets

DETECTION AND RESOLUTION OF CLOSELY SPACED TARGETS IN A MONOPULSE SYSTEM

TECHNICAL FIELD

The present invention relates to imaging and tracking system and, more particularly, to systems and methods for detecting and resolving signals from closely spaced targets in a monopulse system.

BACKGROUND OF THE INVENTION

The problem of detecting and resolving plural targets located within a scan of a monopulse system draws interest from many radar and sonar applications such as target tracking, target recognition, surveillance, biomedical imaging, robotic vision, etc. When two targets or more are scanned by a monopulse antenna or transducer, the angles of arrival of the targets are merged into one angle by the antenna. This merged angle of arrival is far from angles of arrival of all targets within the beam, adds bias and wandering trends to measured targets' trajectories. The merged angle of arrival depends on a number of parameters such as the phase difference between targets' signals, the radar/sonar cross section ratio of the targets, and the angular separation between targets, which makes it difficult to extract any of these parameters directly from the merged data.

Most of existing techniques for detecting and resolving two closely spaced targets from standard monopulse data are limited in some fashion. One category of techniques developed for monopulse antennas with uniform radiation patterns and they require prior knowledge for some targets' parameters such as number of targets within the antenna scan, and radar cross section ratio of those targets. Another set of techniques rely on features of the signal that may not be available because they may occur outside the antenna scan under consideration or may be washed away due to either noise or quantization. A third set of techniques requires data not available in a standard monopulse system. The implementation of these techniques is generally not cost efficient and often requires additional hardware, raising the overall cost and complexity of the system.

SUMMARY OF THE INVENTION

In accordance with one aspect of the present invention, a method is provided for determining first and second azimuth angle values representing two closely spaced targets. Monopulse radar scan data is produced and processed to provide quadrature angle data, merged azimuth angle data, and a maximum magnitude of the quadrature angle. A quadrature angle methodology that derives the first and second azimuth angle values from an integration of the quadrature angle data over an angular region within the monopulse scan is applied if the maximum quadrature angle magnitude exceeds the threshold value. A merged azimuth angle methodology that fits the merged azimuth angle data to a polynomial as a function of a boresight angle of the monopulse radar to derive the first and second azimuth angle values is applied if the maximum quadrature angle magnitude does not exceed the threshold value. The first and second azimuth angle values are then displayed to a user.

In accordance with another aspect of the present invention, a system is provided for processing monopulse scan data. The monopulse scan data includes a quadrature angle value and a merged azimuth angle value for each of a plurality of boresight angles. A multilinear regression component is configured to fit the merged azimuth angle values to a cubic polynomial of the boresight angle of the monopulse radar to provide a set of polynomial coefficients. A model selection component is configured to select a cubic polynomial model if a magnitude of a coefficient of a cubic term of the polynomial exceeds a threshold value and select a linear polynomial model if the magnitude of the coefficient of the cubic term does not exceed the threshold.

In accordance with yet another aspect of the present invention, a system is provided for processing monopulse scan data. The monopulse scan data includes a quadrature angle value and a merged azimuth angle value for each of a plurality of boresight angles. A quadrature integration element is configured to integrate the quadrature angle values over an angular region of the monopulse scan having first and second limits of integration to produce an integration value. An azimuth angle calculator is configured to determine first and second azimuth angle values for respective first and second targets represented by the monopulse scan data as a function of the integration value, respective merged azimuth angle values at each of the first and second limits of integration, and respective quadrature angle values at each of the first and second limits of integration and determine the first and second azimuth angle values from the determined mean of the first and second azimuth angle values and difference between the first and second azimuth angle values.

DETAILED DESCRIPTION OF INVENTION

The invention described herein relates to the efficient processing of signals from a monopulse system to provide angles of arrival for two closely spaced targets. It will be appreciated that monopulse techniques can be implemented with radar systems, sonar systems, and similar sensing arrangements, and a monopulse processor in accordance with an aspect of the present invention can be utilized to extract relative signals from data provided by any system using a monopulse sensing arrangement. In the interest of clarity, terminology consistent with a radar implementation will be utilized throughout this description of the invention and the exemplary implementations herein, as well as in the accompanying claims, to the extent appropriate. For example, the term "antenna" will be used to describe the instrument sending the initial pulse and receiving the monopulse response channels, although it will be appreciated that a sonar arrangement would utilize one or more transducers for this function. Similarly, references to the "radar cross section" and "antenna boresight angle" should be understood to be used generically to encompass analogous concepts in sonar applications.

Figure 1:
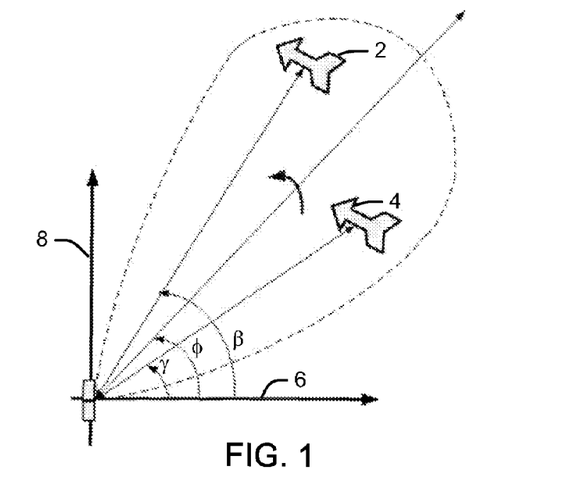
FIG. 1 illustrates a geometry of a monopulse antenna scanning two closely spaced targets.

FIG. 1 illustrates the geometry of a monopulse antenna scanning two closely spaced targets: a first target 2, and a second target 4. The first target 2 is located at a first azimuth angle, $\beta$. The second target 4 is located at second azimuth angle, $\gamma$. The first and second azimuth angles are the angles of arrival of the targets in the azimuth plane. Throughout the text, the azimuth angles will be used to represent angles of arrival in either the azimuth plane or the vertical plane or in both planes. The two targets are scanned by the main beam of a monopulse antenna, with the direction of antenna main beam determined by a variable boresight angle $\phi$. The first azimuth angle, the second azimuth angle, and boresight angle are measured from a first arbitrary axis 6. The first axis 6 is perpendicular to a second axis 8 joining the centers of the two antenna elements (channels).

Figure 2:
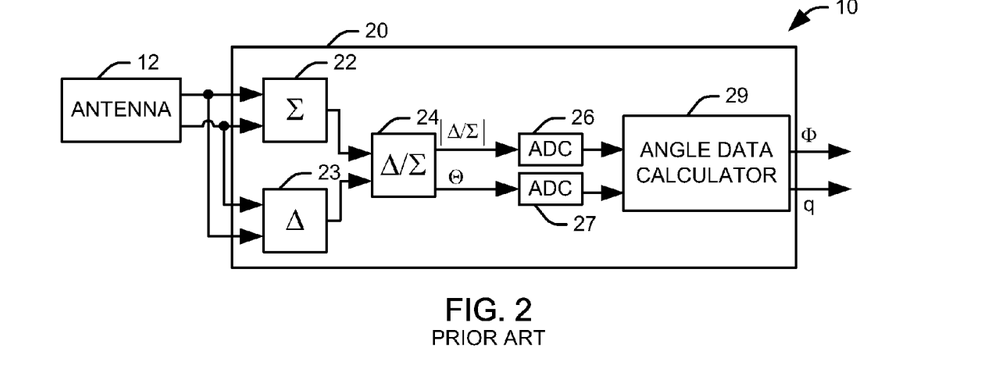
FIG. 2 illustrates an exemplary monopulse system that could be utilized with a monopulse processor in accordance with an aspect of the present invention.

FIG. 2 illustrates an exemplary monopulse scanning arrangement 10 that can be utilized with a monopulse processor in accordance with an aspect of the present invention. In the standard monopulse scanning arrangement, for a given scan from an antenna 12, an antenna beam is split into two or more parts and sent out as a plurality of signals emanating from the antenna in slightly different directions. When the reflected signals are received they are amplified separately and compared to each other, indicating direction of the target relative to the boresight. Since this comparison is carried out during one pulse, which is typically a few microseconds, changes in target position or heading will have no effect on the comparison. The antenna elements, representing the antenna channels, are placed within an azimuth plane for transmission and reception of the monopulse signals. It will be appreciated that the vertical angle of the targets can be measured similarly with two antenna elements placed within a vertical plane, or both the vertical and azimuth planes can be represented in a four channel antenna. The concepts discussed herein in the monopulse processing systems of FIGS. 3, 4, 5, and 6 can be applied in a straightforward manner by one of skill in the art to determine either the azimuth angles, the vertical angles, or both, but for the sake of brevity, the discussion below will center on determination of the azimuth angles of closely spaced targets.

In the illustrated arrangement 10, the return signals from the plurality of signals are received at the antenna 12 as two return channels. The standard monopulse scanner calculates a monopulse ratio by normalizing the difference, $\Delta$, between responses of the two channels over the sum, $\Sigma$, of those responses. Accordingly, a sum of the two return signals is determined at a summer 22, and a difference between the two return signals can be determined at a difference component 23. The monopulse ratio is then calculated at a divider 24 to produce a magnitude, $|\Delta/\Sigma|$, and a phase, $\Theta$, of the monopulse ratio. The magnitude and phase can be quantized at respective analog-to-digital converters (ADCs) 26 and 27. The digitized signal can then be provided to an angle data calculator 29 that calculates real and imaginary parts of monopulse ratio, and hence the merged azimuth, $\overline{\Phi}$, and the quadrature, $\overline{q}$, angles. It will be appreciated that the azimuth data from the monopulse scanner is referred to herein as the "merged" data due to the possibility that it may represent multiple targets. Filtering can be applied to either the calculated merged azimuth and quadrature angle values or the calculated amplitude of the monopulse ratio to reduce signal noise and mitigate the noise introduced by quantization.

For two closely spaced targets, the merged azimuth and the quadrature angles have the following mathematical formulations:

$$\Phi = \kappa \mathrm{Re}\left(\frac{\Delta}{\Sigma}\right) + \phi = \frac{\beta + (\beta + \gamma)\chi\cos\psi + \gamma\chi^2}{1 + \chi^2 + 2\chi\cos\psi} \qquad \mathrm{Eq.\ 1}$$

$$q = \kappa \mathrm{Im}\left(\frac{\Delta}{\Sigma}\right) = -\frac{\alpha_d \chi \sin\psi}{1 + \chi^2 + 2\chi\cos\psi} \qquad \mathrm{Eq.\ 2}$$

where $\kappa$ is the antenna slope, which can be equated to unity without loss of generality, $\beta$ and $\gamma$ are the targets' azimuth angles, $\psi$ is the phase difference between the targets' signals at the antenna, and $\chi$ is the ratio between magnitudes of targets' signals at the antenna. The ratio of the target signal magnitudes, $\chi$, can be represented as:

$$\chi = \sqrt{R}\, \exp(2\zeta\{\alpha_m - \phi\}\alpha_d) \qquad \mathrm{Eq.\ 3}$$

where R is the radar cross section ratio of the two targets, $\alpha_m (\alpha_m = 0.5(\beta\gamma))$ is the mean of the two azimuth angles, $\alpha_d (\alpha_d = \beta - \gamma)$ is difference between the two azimuth angles, and $\zeta$ is a constant related to the antenna three decibel beam width $\theta_0$, such that $$\zeta = 1.3864 \left(\frac{1}{\theta_0}\right)^2 \qquad \mathrm{Eq.\ 4}$$

Figure 3:
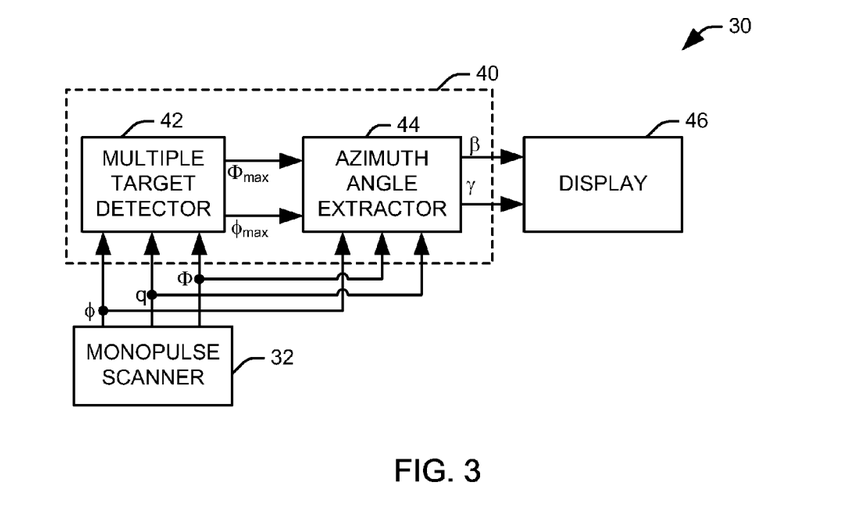
FIG. 3 illustrates a monopulse processor system in accordance with an aspect of the present invention.

FIG. 3 illustrates a monopulse system 30 incorporating in accordance with an aspect of the present invention. The monopulse system 30 includes a monopulse scanner 32 and a monopulse processor 40 that utilizes the monopulse scan data from the monopulse scanner to determine one or more properties of the scanned target and the return signals representing the targets. The monopulse processor 40 includes a multiple target detector 42 that receives values of merged azimuth angle data, $\Phi$, and quadrature angle data, q, and determines a number of targets represented by the monopulse scan data. In one example, the multiple target detector 42 calculates a mean, $\mu_\Phi$, and variance, $\sigma_\Phi$, of the merged azimuth angle data and it compares the variance against a predetermined azimuth angle threshold $\sigma_{th}$. The detector confirms the presence of one target within the antenna scan if the variance is below the threshold. Otherwise, the detector searches for maximum magnitudes, $q_{max}$, of the quadrature angle data and the corresponding antenna boresight angles, $\phi_{max}$. The multiple target detector 42 reports the presence of three targets or more if two maxima or more are found for the magnitude of quadrature angle within the antenna scan. Otherwise, the multiple target detector 42 declares the presence of two targets within the antenna scan. In this case the detector delivers merged azimuth angle data, $\Phi$, and quadrature angle data, q, along with the maximum magnitude of quadrature angle, $q_{max}$, and the corresponding antenna boresight angle $\theta_{max}$, if they exist, to the azimuth angle extractor 44. In case of two targets within the antenna scan, the boresight angle $\phi_{max}$ is related to the mean and difference of the two azimuth angles as follows $$\phi_{max} = \alpha_m + \frac{\log R}{4\zeta\alpha_d} \qquad \text{Eq. 5}$$

The azimuth angle extractor 44 applies one of two models in extracting the targets' azimuth angles, depending on maximum magnitude of quadrature angle $q_{max}$. If $q_{max}$ exceeds a quadrature angle threshold, $q_0$, the azimuth angle extractor applies a quadrature angle algorithm that constructs and solves a quadratic algebraic equation for the targets' azimuth angles. The equation coefficients are obtained through integrating quadrature angle data within an angular region of the antenna scan. If $q_{max} \leq q_0$, the azimuth angle-extractor applies a merged azimuth angle algorithm that fits azimuth angle data to either a cubic or a linear polynomial and uses the polynomials' coefficients in extracting targets' azimuth angles, $\beta$ and $\gamma$, which are provided to an associated display 46.

Figure 4:
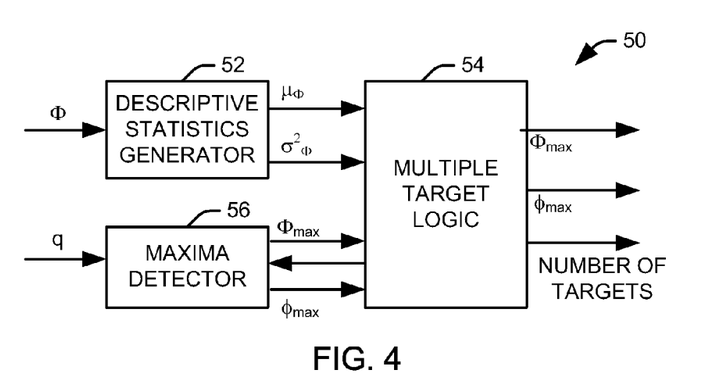
FIG. 4 illustrates an exemplary implementation of a multiple target detector in accordance with an aspect of the present invention.

FIG. 4 illustrates an exemplary multiple target detector 50 that can be utilized in a monopulse processor in accordance with an aspect of the present invention. The multiple target detector 50 determines the number of targets represented within a region of a monopulse scan by calculating the variance of the merged azimuth angle data and determining a number of local maxima in the magnitude of quadrature angle data, and comparing each to an appropriate threshold. To this end, a descriptive statistic generator 52 receives merged azimuth angle from a monopulse scanner and calculates a mean, $\mu_\Phi$, and a variance, $\sigma^2_\Phi$. The mean and variance of the merged azimuth angle are provided to a multiple target logic component 54 that compares the computed variance to a threshold variance, $\sigma^2_{th}$. The threshold value can, for example, be determined empirically for a given system as a maximum variance in the azimuth angle data observed when presented with single targets, or an appropriate value can be estimated from the properties of the monopulse scanner. If the calculated variance falls below the threshold variance, it is determined that the data represents a single target, and the mean of the azimuth angle data is output as the azimuth angle for the target.

If the calculated variance exceeds the threshold variance, the quadrature angle data from the monopulse scanner is analyzed at a maxima detector 56. The maxima detector 56 determines the location and number of local maxima within the magnitude of quadrature angle data. Any appropriate optimization methodology for locating the maxima of a numerical data set may be utilized, such as a gradient search or similar algorithm, to locate the maxima. The multiple target logic 54 then determines if the number of located maxima is greater than one. If so, it is determined that three or more targets are present. Otherwise, it is determined that two targets are present within the monopulse scan, and the merged azimuth angle data, the quadrature angle data, the maximum value of the quadrature angle, $q_{max}$, if any, and the corresponding boresight angle, $\phi_{max}$, are output from the multiple target detector 50.

Figure 5:
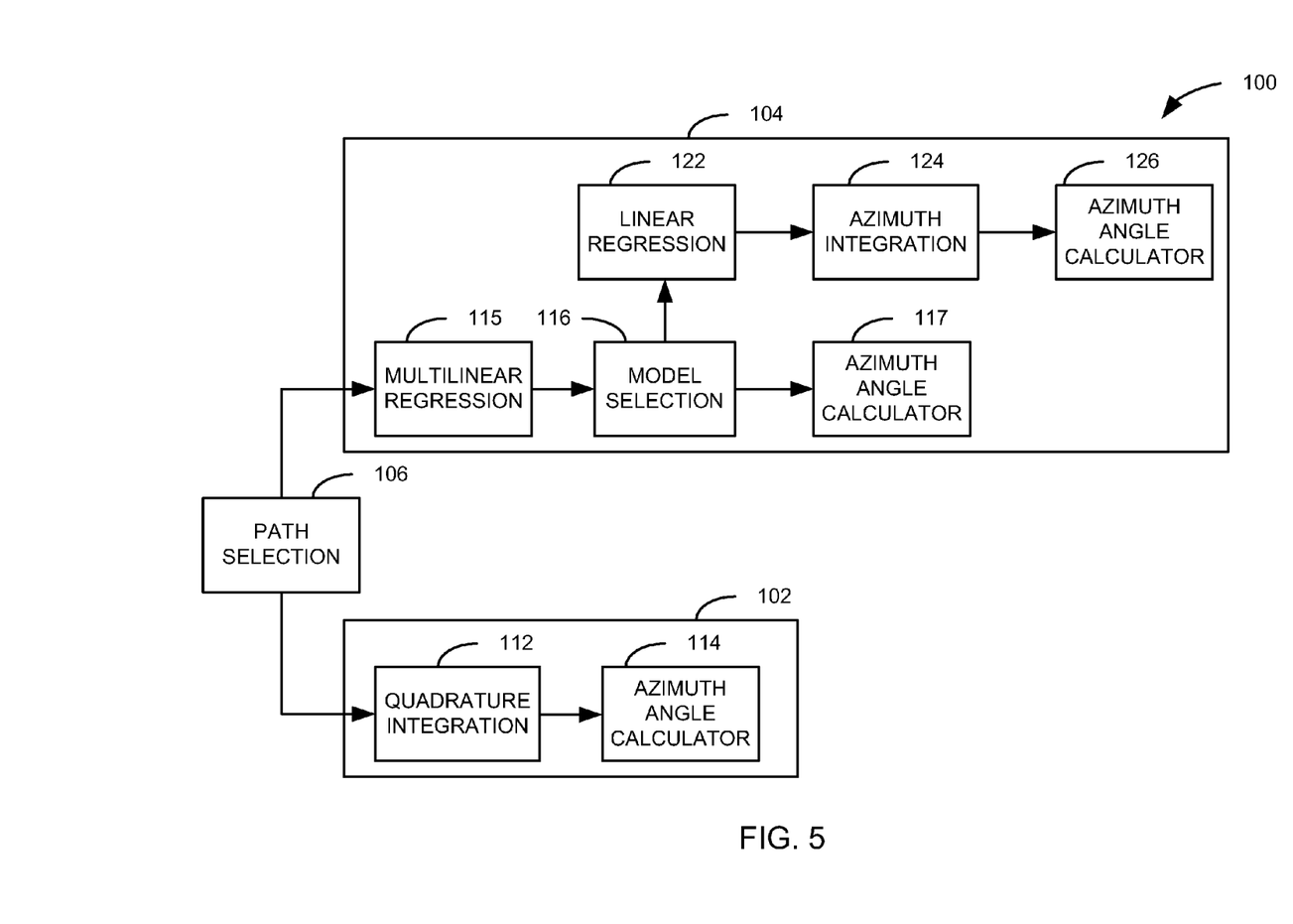
FIG. 5 illustrates an azimuth angle extractor in accordance with an aspect of the present invention.

FIG. 5 illustrates an exemplary azimuth angle extractor 100 in accordance with an aspect of the present invention. The azimuth angle extractor 100 determines respective azimuth angles for two closely spaced targets in a monopulse scan. The illustrated azimuth angle extractor 100 receives data from other portions of a monopulse system, including a set of merged azimuth angle data, [$\Phi$], a set of quadrature angle data, [q], a maximum value for the quadrature angle, $q_{max}$, and an antenna boresight angle, $\phi_{max}$, corresponding to the maximum quadrature angle, and uses one of two elements, a quadrature angle element 102 and a merged azimuth angle element 104, to calculate target azimuth angles, $\beta$ and $\gamma$, for the two closely spaced targets. In accordance with an aspect of the present invention, the quadrature angle element 102 is used when determined values of the quadrature angle, that is, the imaginary part of the monopulse ratio, are higher than noise level, and merged azimuth angle element 104 is used when determined values of the quadrature angle data are lower than noise level. To this end, the azimuth angle extractor 100 comprises a path selection element 106 that compares the maximum quadrature angle to a threshold value, $q_0$, representing a noise level of the monopulse return signal. If the maximum quadrature angle value exceeds the threshold value, the quadrature angle element 102 is selected and utilized to determine the azimuth angles for the two targets. If the maximum quadrature angle value fails to exceed the threshold value, the merged azimuth angle element 104 is selected and utilized to determine the targets' azimuth angles. In one implementation, a quadrature angle threshold value of 0.17 is used.

The quadrature angle element 102 includes a quadrature integration component 112 that integrates quadrature angle data over an angular region within the monopulse scan. In performing the integration, the quadrature integration element 112 starts by selecting the angular integration region, from a first boresight angle, $\phi_1$, to a second boresight angle, $\phi_2$. The first and second boresight angles are selected as to define a region that excludes the boresight angle, $\phi_{max}$, associated with maximum magnitude of quadrature angle data. After selecting the integration region, the quadrature integration element 112 integrates the quadrature angle data to provide an integrated quadrature value, F, determined as:

$$F = 2\zeta \int_{\phi_1}^{\phi_2} q\, d\phi \qquad \text{Eq. 6}$$

Once the quadrature angle data is integrated, the integration output is used along with values for the quadrature angle data ($q_1$, $q_2$) and merged angle data ($\Phi_1$, $\Phi_2$) at the integration limits to estimate mean $\alpha_m$ and difference $\alpha_d$ of targets' azimuth angles at a first azimuth angle calculator 114. The mean of the targets' azimuth angles can be calculated as:

$$\alpha_m = \frac{1}{2}[(\Phi_1 + \Phi_2) + (q_2 - q_1)/\tan F] \qquad \text{Eq. 7}$$

The difference between the targets' azimuth angles can be calculated as:

$$\alpha_d = 2\sqrt{\alpha_m^2 - C} \qquad \text{Eq. 8}$$

where:

$$C = q_2 q_1 + \Phi_1 \Phi_2 + (q_2 \Phi_1 - q_1 \Phi_2)/\tan F \qquad \text{Eq. 9}$$

In accordance with an aspect of the present invention, the formulas for the estimated mean, $\alpha_m$ and difference, $\alpha_d$, are derived from the two solutions of a quadratic algebraic equation, $$\beta^2 - 2\alpha_m \beta + C = 0 \qquad \text{Eq. 10}$$

Once the mean and difference of the targets' azimuth angles has been determined, the first azimuth angle calculator 114 can determine the azimuth angle values, β and γ, of the two targets as:

$$\beta = \alpha_m + \alpha_d/2 \qquad \text{Eq. 11}$$

$$\gamma = \alpha_m - \alpha_d/2 \qquad \text{Eq. 12}$$

Equation 10 is obtained through integrating the result of Equation 2 while changing the integration variable from the antenna boresight angle φ to the magnitude ratio χ between targets' signals to get $$F = \arctan\left[\frac{\chi_2 + \cos\psi}{\sin\psi}\right] - \arctan\left[\frac{\chi_1 + \cos\psi}{\sin\psi}\right] \qquad \text{Eq. 13}$$

To get rid of the unknowns $\chi_1, \chi_2$, and ψ from Equation 13, Equation 1 can be rewritten as:

$$\Phi = \beta - \frac{\alpha_d \chi(\chi + \cos\psi)}{1 + \chi^2 + 2\chi\cos\psi} \qquad \text{Eq. 14}$$

Using Equation 2 yields:

$$\frac{\chi_i + \cos\psi}{\sin\psi} = \frac{\Phi_i - \beta}{q_i} \qquad \text{Eq. 15}$$

Setting i=1,2 in Equation 15 and introducing the resultants into Equation 13 yields:

$$F = \arctan\left[\frac{(\Phi_2 - \beta)q_1 - (\Phi_1 - \beta)q_2}{q_2 q_1 + (\Phi_2 - \beta)(\Phi_1 - \beta)}\right] \qquad \text{Eq. 16}$$

Inverting Equation 16 yields the quadratic algebraic equation of Equation 10, solved for the mean and the difference between the two azimuth angles.

The merged azimuth angle element, 104 fits merged azimuth angle data, [Φ], to a cubic polynomial function of the corresponding antenna boresight angles, φ, to acquire a set of polynomial coefficients at a multilinear regression element 115. Specifically, the azimuth angle data can be fitted to a cubic polynomial via a multilinear regression process to find the polynomial coefficients, $a_1, a_2, a_3$, and $a_4$ in the following model:

$$\Phi = a_1 \phi^3 + a_2 \phi^2 + a_3 \phi + a_4 \qquad \text{Eq. 17}$$

For example, we can select N antenna boresight angles ($\phi_1, \phi_2, \ldots, \phi_N$) surrounding a central boresight angle $\phi_0$. It will be appreciated that the central boresight angle, $\phi_0$, may be including as one of the N angles. We use the cubic polynomial of Eq. 17 to construct a matrix equation relating the boresight angles $\phi_i$'s (i=1, ..., N) and the corresponding merged direction of arrivals $\Phi_i$'s (i=1, ..., N), such that:

$$\vec{\Phi} = \overline{\overline{\phi}} \vec{a} \qquad \text{Eq. 18}$$

where $\vec{a} = \begin{bmatrix} a_4 \\ a_3 \\ a_2 \\ a_1 \end{bmatrix}$, $\vec{\Phi} = \frac{1}{N} \begin{bmatrix} \sum_{j=1}^{N} \Phi_j \\ \sum_{j=1}^{N} \Phi_j \phi_j \\ \sum_{j=1}^{N} \Phi_j \phi_j^2 \\ \sum_{j=1}^{N} \Phi_j \phi_j^3 \end{bmatrix}$, and $$\overline{\overline{\phi}} = \frac{1}{N} \begin{bmatrix} N & \sum_{j=1}^{N} \phi_j & \sum_{j=1}^{N} \phi_j^2 & \sum_{j=1}^{N} \phi_j^3 \\ \sum_{j=1}^{N} \phi_j & \sum_{j=1}^{N} \phi_j^2 & \sum_{j=1}^{N} \phi_j^3 & \sum_{j=1}^{N} \phi_j^4 \\ \sum_{j=1}^{N} \phi_j^2 & \sum_{j=1}^{N} \phi_j^3 & \sum_{j=1}^{N} \phi_j^4 & \sum_{j=1}^{N} \phi_j^5 \\ \sum_{j=1}^{N} \phi_j^3 & \sum_{j=1}^{N} \phi_j^4 & \sum_{j=1}^{N} \phi_j^5 & \sum_{j=1}^{N} \phi_j^6 \end{bmatrix}.$$

Solving for the vector $\vec{a}$, we get:

$$\vec{a} = \overline{\overline{\phi}}^{-1} \vec{\Phi} \qquad \text{Eq. 19}$$

where $\overline{\overline{\phi}}^{-1}$ the inverse of the matrix $\overline{\overline{\phi}}$.

One of skill in the art will appreciate that a number of methods exist for finding the inverse of a matrix, and any of these methods can be utilized in determining values for the elements of the vector $\vec{a}$. In one implementation, to facilitate the determination of the inverse, the matrix $\overline{\overline{\phi}}$ can be portioned into sub-matrices with lower dimensions, such that:

$$\overline{\overline{\phi}} = \begin{bmatrix} \overline{\overline{\phi}}_{11} & \overline{\overline{\phi}}_{12} \\ \overline{\overline{\phi}}_{21} & \overline{\overline{\phi}}_{22} \end{bmatrix} \text{ where each of } \overline{\overline{\phi}}_{11}, \overline{\overline{\phi}}_{12}, \overline{\overline{\phi}}_{21}, \text{ and} \qquad \text{Eq. 20}$$

$\overline{\overline{\phi}}_{22}$ is a 2×2 matrix.

Finding an inverse of these 2×2 matrices is relatively straightforward, and the inverse, $\overline{\overline{\phi}}^{-1}$, can be determined as products of the sub-matrices and their inverses, such that:

$$\overline{\overline{\phi}}^{-1} = \begin{bmatrix} \overline{\overline{F}}_{11} & \overline{\overline{F}}_{12} \\ \overline{\overline{F}}_{21} & \overline{\overline{F}}_{22} \end{bmatrix} \qquad \text{Eq. 21}$$

where $\overline{\overline{F}}_{11} = \left[\overline{\overline{\phi}}_{11} - \overline{\overline{\phi}}_{12} \overline{\overline{\phi}}_{22}^{-1} \overline{\overline{\phi}}_{21}\right]^{-1}$, $\overline{\overline{F}}_{22} = \left[\overline{\overline{\phi}}_{22} - \overline{\overline{\phi}}_{21} \overline{\overline{\phi}}_{11}^{-1} \overline{\overline{\phi}}_{12}\right]^{-1}$, $\overline{\overline{F}}_{12} = -\overline{\overline{\phi}}_{11}^{-1} \overline{\overline{\phi}}_{12} \overline{\overline{F}}_{22}$, and $\overline{\overline{F}}_{21} = -\overline{\overline{\phi}}_{22}^{-1} \overline{\overline{\phi}}_{21} \overline{\overline{F}}_{11}$ It will be appreciated that calculating the coefficients via linear regression techniques in each of the linear polynomial model 122 and the cubic polynomial model 115 has the benefit of reducing effects of noise and phase quantization within the analysis, making the calculation of the relative signals for two closely spaced targets via a monopulse processor in accordance with an aspect of the present invention more efficient and accurate than known methods.

Once the polynomial coefficients have been determined, a model selection component 116 determines whether the cubic polynomial model is suitable for representing the azimuth angle data. To this end, the magnitude of the coefficient of the cubic term is compared to a threshold value to determine if the cubic model accurately represents the trend of the merged azimuth angle data. In one implementation, the threshold value is equal to 0.005. If the magnitude of coefficient of the cubic term exceeds the threshold, the mean and difference of the targets' azimuth angle values can be determined at a second azimuth angle calculator 117 from the determined set of polynomial coefficients as:

$$\alpha_m = a_4 + a_3\phi_{max} + a_2\phi_{max}^2 + a_1\phi_{max}^3 \quad \text{Eq. 22}$$

$$\alpha_d = \sqrt{2m/\zeta} \quad \text{Eq. 23}$$

$$\text{where: } \phi_{max} = -\frac{a_2}{3a_3}, \text{ and } m = a_2\phi_{max} + a_3. \quad \text{Eq. 24}$$

Equations 22-24 are obtained through solving the following identities which are obtained through expanding Equation 3 around $\phi_{max}$ and introducing the resultant into Equation 1:

$$a_1 = -2\zeta m^2 \quad \text{Eq. 25}$$

$$a_2 = 6\zeta m^2 \phi_{max} \quad \text{Eq. 26}$$

$$a_3 = m(1 - 6\zeta m \phi_{max}^2) \quad \text{Eq. 27}$$

$$a_4 = \alpha_m - m\phi_{max}(1 - 2\zeta m \phi_{max}^2) \quad \text{Eq. 28}$$

$$m = \frac{\zeta \alpha_d^2}{1 + \cos\psi} \quad \text{Eq. 29}$$

From the determined mean (from Equation 22) and difference (from Equation 23) of the azimuth angles, the azimuth angles, $\beta$ and $\gamma$, can be determined by the second azimuth angle calculator 117 as shown above in Equations. 11 and 12.

If the magnitude of the coefficient of the cubic term fails to exceed the threshold, the cubic model does not accurately capture the trend of the merged azimuth data and a linear model is utilized. At a linear regression component 122, the merged azimuth angle data is fitted to a linear function of the antenna boresight angle to determine a first order coefficient, $a_1$, and an intercept value, $a_2$, as follows:

$$\Phi = a_1\phi + a_2 \quad \text{Eq. 30}$$

The coefficients $a_1$ and $a_2$ of Equation 30 can be obtained from Equation 27 for $a_3$ and Equation 28 for $a_4$ through ignoring terms of order $m^2$, and replacing $a_3$, and $a_4$ by $a_1$ and $a_2$ respectively to get:

$$a_3 = m \quad \text{Eq. 31}$$

$$a_4 = \alpha_m - m\phi_{max} \quad \text{Eq. 32}$$

In addition to the coefficient values, an integration term, w, of the merged azimuth angle data can be determined at an azimuth integration component 124. In performing the integration, the azimuth integration component 124 starts by selecting the angular integration region, bounded by a first boresight angle, $\phi_1$, and a second boresight angle, $\phi_2$. After selecting the integration region, the azimuth integration component 124 integrates the azimuth angle data to provide an integrated quadrature value, w, determined as:

$$w = \frac{1}{\Delta\phi}\int_{\phi_1}^{\phi_2} \Phi \, d\phi \text{ where } \Delta\phi = \phi_2 - \phi_1. \quad \text{Eq. 33}$$

From the polynomial coefficients and performing the integration of the merged azimuth angle data, a third azimuth angle calculation component 126 estimates a difference, $\alpha_d$, between the targets' azimuth angles and a mean, $\alpha_m$, of the targets' azimuth angles as:

$$\alpha_d = \sqrt{\frac{2a_1}{\zeta}} \quad \text{Eq. 34}$$

$$\alpha_m = \alpha_0 + \frac{\zeta\alpha_d}{2a_1}(\alpha_0 - a_2)^2 - \frac{\zeta\alpha_d}{2}(\alpha_0 - a_2)(\phi_1 + \phi_2) \text{ where} \quad \text{Eq. 35}$$

$$\alpha_0 = \frac{1}{2}\left[w + a_2 + a_1\left\{\frac{1}{2}(\phi_1 + \phi_2) + \frac{\zeta\alpha_d}{3}(\phi_1^2 + \phi_1\phi_2 + \phi_2^2)\right\}\right]$$

From the determined mean and difference of the azimuth angles, the azimuth angles, $\beta$ and $\gamma$, can be determined by the third azimuth angle calculation component 126 as shown above in Equations. 11 and 12.

Equations 34 and 35 are obtained through solving Equations 31 and 32, and applying the following identity which is obtained from the integration of Equation 1 over the antenna boresight angle:

$$w = \alpha_m + m\phi_{max} - m\left[\frac{1}{2}(\phi_1 + \phi_2) + \right. \quad \text{Eq. 36}$$

$$\left. \zeta\alpha_d\phi_{max}(\phi_{max} - \{\phi_1 + \phi_2\}) + \frac{\zeta\alpha_d}{3}(\phi_1^2 + \phi_1\phi_2 + \phi_2^2)\right]$$

Figure 6:
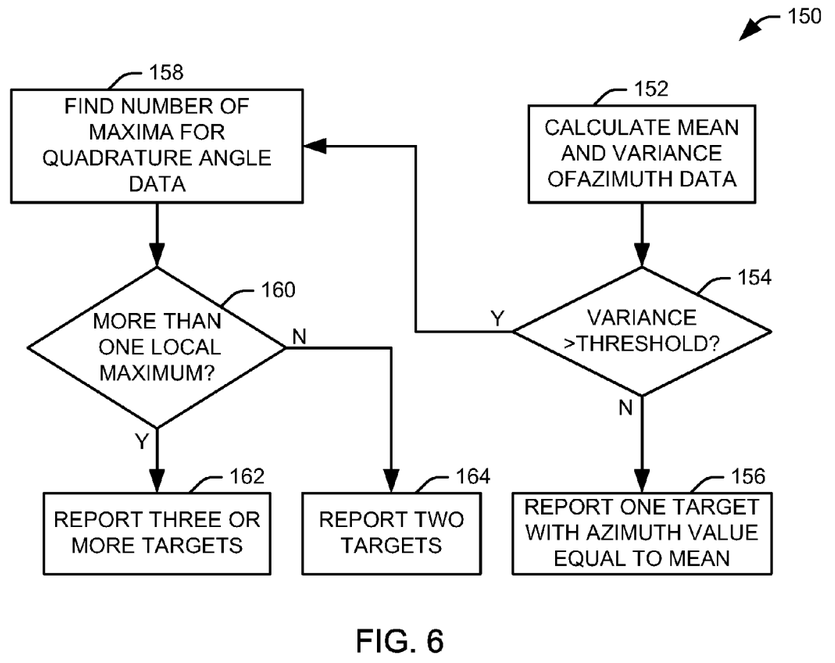
FIG. 6 illustrates a methodology for processing data from a monopulse system to determine a number of targets represented by the monopulse scan data.
Figure 7:
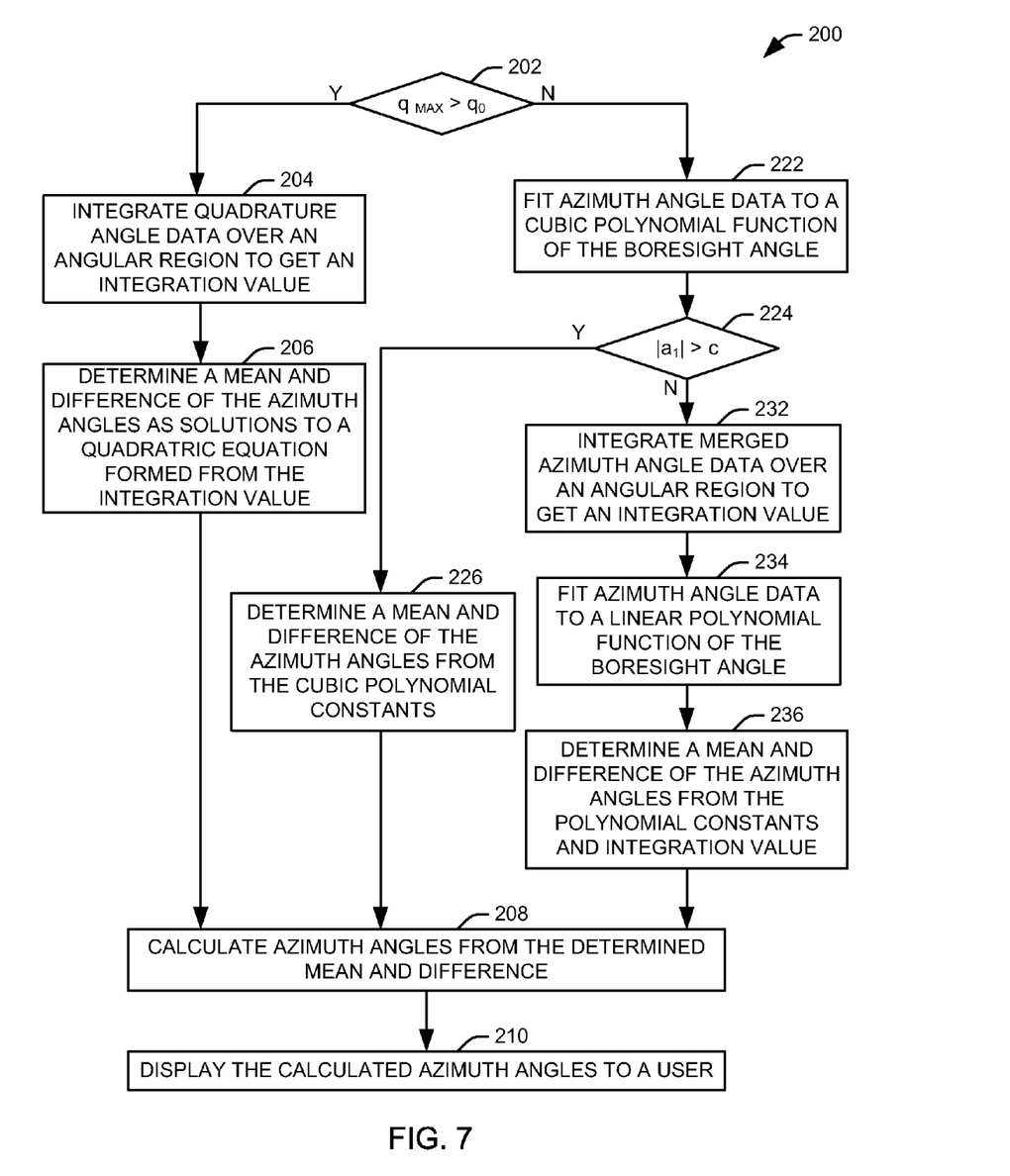
FIG. 7 illustrates a methodology for processing data from a monopulse system representing two closely spaced targets to extract first and second azimuth angles representing the two closely spaced targets.

In view of the foregoing structural and functional features described above, methodologies in accordance with various aspects of the present invention will be better appreciated with reference to FIGS. 6 and 7. While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention FIG. 6 illustrates a methodology 150 for processing data from a monopulse system to determine a number of targets represented by the monopulse scan data. At 152, a mean, $\mu_\Phi$, and a variance, $\sigma^2_\Phi$, of the merged azimuth angle data are determined. At 154, the variance of the merged azimuth angle is compared to a threshold variance, $\sigma^2_{th}$, the threshold variance representing a noise level of the monopulse scan data. The threshold value can, for example, be determined empirically for a given system as a maximum variance in the azimuth angle data observed when presented with single targets, or an appropriate value can be estimated from the properties of the monopulse scanner. If the calculated variance falls below the threshold variance (N), it is reported at 156 that the data represents a single target, and the mean of the azimuth angle data is output as the azimuth angle for the target.

If the calculated variance exceeds the threshold variance (Y), the methodology continues to 158, where the location and number of local maxima within the magnitude of quadrature angle data are determined. Any appropriate optimization methodology for locating the maxima of a numerical data set may be utilized, such as a gradient search or similar algorithm, to locate the maxima. At 160, it is determined if the number of located maxima is greater than one. If so (Y), it is reported at 162 that three or more targets are present. Otherwise (N), it is reported at 164 that two targets are present within the monopulse scan, and the azimuth angle data, the quadrature angle data, the maximum value of the quadrature angle, $q_{max}$, if any, and the corresponding boresight angle, $\phi_{max}$, are output.

FIG. 7 illustrates an exemplary methodology 200 for determining first and second azimuth angle values representing two closely spaced targets from monopulse scan data. At 202, a maximum magnitude of the quadrature angle from the monopulse scan data is compared to a threshold value. If the maximum magnitude of the quadrature angle exceeds a threshold value (Y), the methodology proceeds to 204, where the quadrature angle data is integrated over an angular region within the monopulse scan having first and second limits of integration to produce an integration value. The angular region can be selected to exclude the region of the maximum value of the magnitude of quadrature angle. At 206, a mean and difference of the first and second azimuth angle values are determined as solutions to a quadrature equation that is a function of the integration value, respective merged azimuth angle values at each of the first and second limits of integration, and respective quadrature angle values at each of the first and second limits of integration. Accordingly, the determined mean and difference values are each a function of the integration value, respective merged azimuth angle values at each of the first and second limits of integration, and respective quadrature angle values at each of the first and second limits of integration.

At 208, each of the first and second azimuth angle values are determined from the calculated mean and difference of the azimuth angles. For example, the first azimuth angle value can be determined as the sum of the mean of the first and second azimuth angle values and one-half of the difference between the first and second azimuth angle values and the second azimuth angle value as difference between the mean of the first and second azimuth angle values and one-half of the difference between the first and second azimuth angle values. The determined azimuth values are then displayed to a user at 210.

If the maximum magnitude of the quadrature angle fails to exceed a threshold value (N), the methodology proceeds to 222, where the merged azimuth angle data is fit to a cubic polynomial as a function of the boresight angle of the monopulse antenna to provide a set of polynomial coefficients. At 224, a magnitude of a coefficient of a cubic term from the set of polynomial coefficients is compared to a second threshold value. If the magnitude of the cubic term coefficient exceeds the threshold (Y), the methodology proceeds to 226, where the mean and difference of the first and second azimuth angle values are calculated from the set of polynomial coefficients. The methodology then proceeds to 208, where the first and second azimuth angle values are determined from the calculated sum and difference values, and displayed to a user at 210.

If the magnitude of the cubic term coefficient fails to exceed the threshold (N), the methodology proceeds to 232, where the merged azimuth angle data is integrated over an angular region of the monopulse scan to produce an integration value. At 234, the merged azimuth angle data is fitted to a linear polynomial function of the boresight angle to produce a first order coefficient and a constant value. At 236, the mean and difference of the first and second azimuth angle values can be determined as a function of the first order coefficient, the constant value, and the integration value. In one implementation, the mean is a function of each of the first order coefficient, the constant value, and the integration value, and the difference is a function of the first order coefficient. The methodology then proceeds to 208, where the first and second azimuth angle values are determined from the calculated sum and difference values, and displayed to a user at 210.

Figure 8:
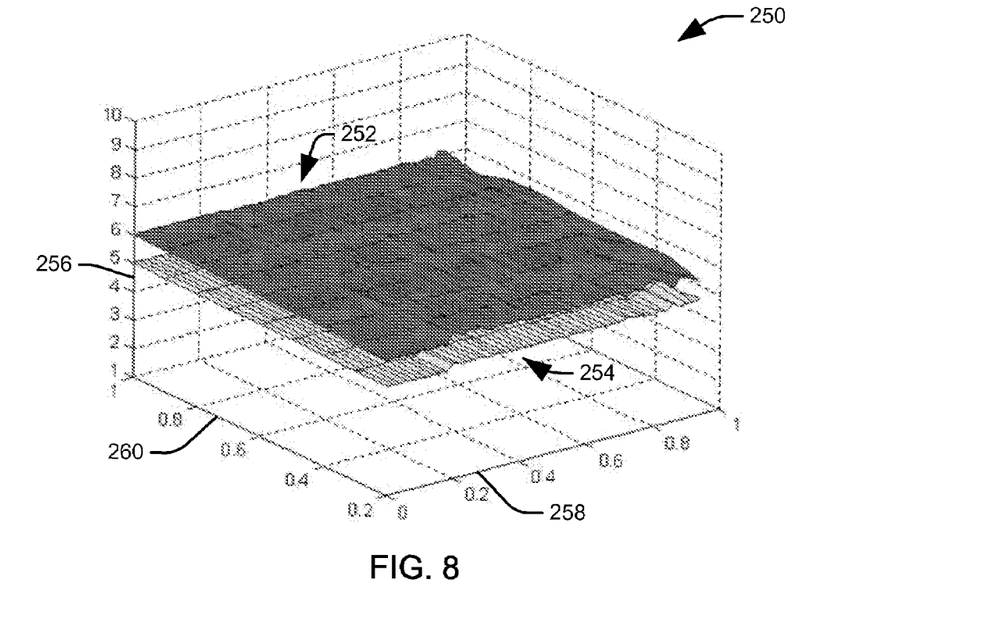
FIG. 8 illustrates predicted azimuth angles for two targets separated by a quarter antenna beam width with 8-bit phase quantization as a function of phase difference between targets' signals and as a function of radar cross section ratio (first azimuth angle=6°, second azimuth angle=5°, antenna beam width=4°).

FIG. 8 is a chart 250 illustrating simulated results for a monopulse processing system in accordance with an aspect of the present invention for two closely spaced targets, a first closely spaced target 252 and a second closely spaced target 254. For the purpose of simulating the data in the chart 250, the two targets are assumed to be separated by a quarter antenna beam width in the presence of 8-bit phase quantization, with the data taken at a monopulse antenna having a three decibel beam width of four degrees. A first target 252 has a first azimuth angle of six degrees, and a second target 254 has a second azimuth angle of five degrees. The antenna is set to scan an azimuth angle range between 4 and 8 degrees. Then by using the relationships shown in Equations 1 and 2 above, and varying the phase difference within the range of 0-180 degrees (0-$\pi$ radian), and varying the radar cross section ratio, R, within the range of 0.1-1, the simulated data is generated. Upon generating the simulated data, it is analyzed via a monopulse processing system in accordance with the present invention to retrieve values of the targets' azimuth angles, as depicted in the chart 250. Specifically, the predicted azimuth angles of the two closely spaced targets, represented by a first axis 256, are shown as a function of the phase difference between targets' signals, represented by a second axis 258, and as a function of the radar cross section ratio of the two targets, represented on a third axis 260. As can be seen in the simulated data, a monopulse system in accordance with an aspect of the present invention is efficient in predicting values of azimuth angles.

Figure 9:
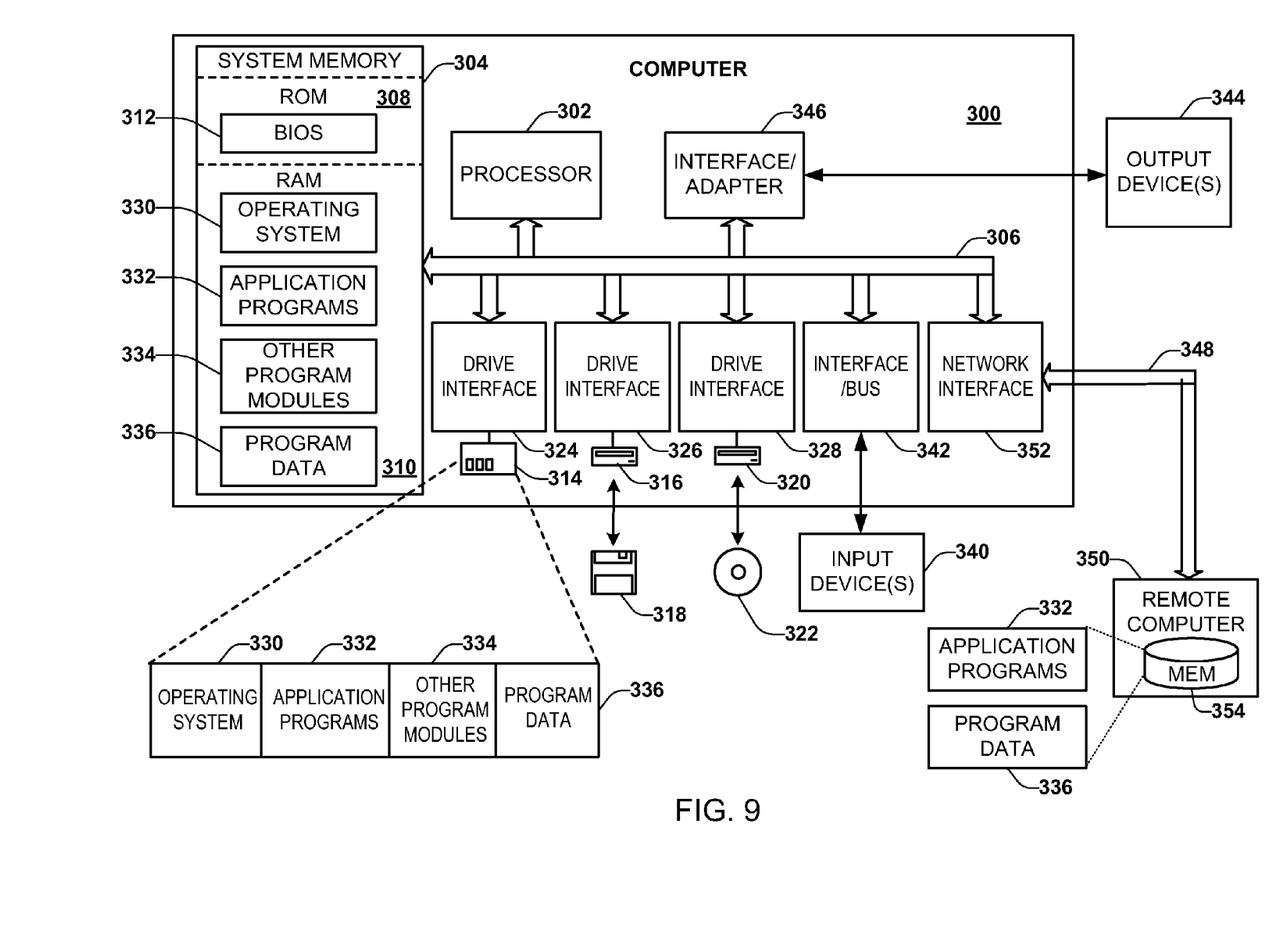
FIG. 9 illustrates a computer system that can be employed to implement systems and methods described herein, such as based on computer executable instructions running on the computer system.

FIG. 9 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

A combination of components or methodologies for the present invention could be used within the monopulse radar of UPX-39 identification system built by Northrop Grumman Navigation Systems Division (NSD). It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A method for determining first and second azimuth angle values representing two closely spaced targets comprising:
    performing a monopulse scan that includes the two closely spaced targets at a monopulse system to produce monopulse radar scan data;
    processing the monopulse scan data to provide quadrature angle data, merged azimuth angle data, and a maximum magnitude of the quadrature angle;
    comparing the maximum magnitude of the quadrature angle to a threshold value;
    applying a quadrature angle methodology that derives the first and second azimuth angle values from an integration of the quadrature angle data over an angular region within the monopulse scan if the maximum magnitude of the quadrature angle exceeds the threshold value;
    applying a merged azimuth angle methodology that fits the merged azimuth angle data to a polynomial as a function of a boresight angle of the monopulse radar to derive the first and second azimuth angle values if the maximum magnitude of the quadrature angle does not exceed the threshold value; and
    displaying the first and second azimuth angle values to a user at an associated display.

2. The method of claim 1, the threshold value being determined as a function of a noise level of the monopulse radar scan data.

3. The method of claim 1, wherein applying a merged azimuth angle methodology comprises:
    fitting the merged azimuth angle data to a cubic polynomial as a function of the boresight angle of the monopulse radar to provide a set of polynomial coefficients;
    comparing a magnitude of a coefficient of a cubic term from the set of polynomial coefficients to a second threshold value;
    calculating the first and second azimuth angle values from the set of polynomial coefficients if the magnitude of the coefficient of the cubic term does not fall below the second threshold value; and
    determining the first and second azimuth angle values from a linear polynomial model if the magnitude of the coefficient of the cubic term falls below the second threshold value.

4. The method of claim 3, wherein calculating the first and second azimuth angle values from the set of polynomial coefficients comprises:
    determining a mean of the first and second azimuth angle values as a cubic function of a boresight angle associated with the maximum quadrature angle;
    determining a difference between the first and second azimuth angle values as a function of the boresight angle associated with the maximum quadrature angle and the set of polynomial coefficients;
    determining the first azimuth angle value as the sum of the mean of the first and second azimuth angle values and one-half of the difference between the first and second azimuth angle values; and
    determining the second azimuth angle value as difference between the mean of the first and second azimuth angle values and one-half of the difference between the first and second azimuth angle values.

5. The method of claim 3, wherein determining the first and second azimuth angle values from a linear polynomial model comprises:
    integrating the merged azimuth angle data over an angular region of the monopulse scan to produce an integration value;

fitting the merged azimuth data to a linear polynomial function of the boresight angle to produce a first order coefficient and a constant value;

determining a mean of the first and second azimuth angle values as a function of the first order coefficient, the constant value, and the integration value;

determining a difference between the first and second azimuth angle values as a function of the first order coefficient;

determining the first azimuth angle value as the sum of the mean of the first and second azimuth angle values and one-half of the difference between the first and second azimuth angle values; and determining the second azimuth angle value as difference between the mean of the first and second azimuth angle values and one-half of the difference between the first and second azimuth angle values.

6. The method of claim 1, wherein applying a quadrature angle methodology comprises:

integrating the quadrature angle data over an angular region of the monopulse scan having first and second limits of integration to produce an integration value;

determining a mean of the first and second azimuth angle values as a function of the integration value, respective merged azimuth angle values at each of the first and second limits of integration, and respective quadrature angle values at each of the first and second limits of integration;

determining a difference between the first and second azimuth angle values as a function of the integration value, respective azimuth angle values at each of the first and second limits of integration, respective quadrature angle values at each of the first and second limits of integration, and the mean of the first and second azimuth angles determining the first azimuth angle value as the sum of the mean of the first and second azimuth angle values and one-half of the difference between the first and second azimuth angle values; and determining the second azimuth angle value as difference between the mean of the first and second azimuth angle values and one-half of the difference between the first and second azimuth angle values.

7. A system for processing monopulse scan data, the monopulse scan data comprising a quadrature angle value and a merged azimuth angle value for each of a plurality of boresight angles, comprising:

a multilinear regression component configured to fit the merged azimuth angle values to a cubic polynomial of the boresight angle of the monopulse radar to provide a set of polynomial coefficients; and a model selection component configured to select a cubic polynomial model if a magnitude of a coefficient of a cubic term of the set of polynomial coefficients exceeds a threshold value and select a linear polynomial model if the magnitude of the coefficient of the cubic term does not exceed the threshold.

8. The system of claim 7, wherein the linear polynomial model comprises:

an azimuth integration component configured to integrate the merged azimuth angle values over an angular region of the monopulse scan to produce an integration value;

a linear regression element configured to fit the merged azimuth angle values to a linear polynomial function of the boresight angles to produce a first order coefficient and a constant value;

an azimuth angle calculator configured to determine a mean of a first azimuth angle value and a second azimuth angle value representing two closely spaced targets and a difference between the first and second azimuth angle values as a function of the first order coefficient, the constant value, and the integration value, determine a difference between the first and second azimuth angle values as a function of the first order coefficient, and determine the first and second azimuth angle values from the determined mean of the first and second azimuth angle values and difference between the first and second azimuth angle values.

9. The system of claim 7, further comprising a path selection element that compares a maximum value of a magnitude of quadrature angle values associated with the plurality of boresight angles to a threshold value, each of the multilinear regression component, the model selection component, the cubic polynomial model, and the linear polynomial model being utilized to process the monopulse scan data only if the maximum value of the quadrature angle values fails to exceed the threshold value.

10. The system of claim 9, further comprising a quadrature angle element configured to determine a first azimuth angle value and a second azimuth angle value representing two closely spaced targets, comprising:

a quadrature integration element configured to integrate the quadrature angle values over an angular region of the monopulse scan having first and second limits of integration to produce an integration value; and an azimuth angle calculator configured to determine a mean of the first and second azimuth angle values and a difference between the first and second azimuth values as a function of the integration value, respective merged azimuth angle values at each of the first and second limits of integration, and respective quadrature angle values at each of the first and second limits of integration and determine the first and second azimuth angle values from the determined mean of the first and second azimuth angle values and difference between the first and second azimuth angle values;

the quadrature angle element being utilized to determine only if the maximum value of the quadrature angle values exceeds the threshold value.

11. The system of claim 7, further comprising a multiple target detector that determines a number of targets represented by monopulse scan data, the multiple target detector comprising:

a descriptive statistics generator configured to generate a mean and a variance of the merged azimuth angle values;

a maxima detector configured to determine the number and location of local maxima within the magnitude of quadrature angle values; and a multiple target logic component configured to determine a number of targets represented by the monopulse scan data from the variance of the merged azimuth angle values and the number of local maxima within the quadrature angle values.

12. The system of claim 11, wherein the multiple target logic component is configured to determine that the monopulse scan data represents one target if the variance of the merged azimuth angle values is less than a threshold value, to determine that the monopulse scan data represents more than two targets if the variance of the merged azimuth angle values exceeds the threshold value and the number of maxima within the magnitude of quadrature angle values is greater than one, and to determine that the monopulse scan data represents two targets if the variance of the merged azimuth angle values exceeds the threshold value and the number of maxima within the magnitude of quadrature angle values is not greater than one.

13. The system of claim 7, the cubic polynomial model being configured to calculate a first azimuth angle value and a second azimuth angle value representing two closely spaced targets from the set of polynomial coefficients.

14. A system for processing monopulse scan data, the monopulse scan data comprising a quadrature angle value and a merged azimuth angle value for each of a plurality of boresight angles, comprising:
   a quadrature integration element configured to integrate the quadrature angle values over an angular region of the monopulse scan having first and second limits of integration to produce an integration value; and
   an azimuth angle calculator configured to determine respective first and second azimuth angle values for respective first and second targets represented by the monopulse scan data as a function of the integration value, respective azimuth angle values at each of the first and second limits of integration, and respective quadrature angle values at each of the first and second limits of integration and determine the first and second azimuth angle values from the determined mean of the first and second azimuth angle values and difference between the first and second azimuth angle values.

15. The system of claim 14, further comprising a path selection element that compares a maximum value of quadrature angle values associated with the plurality of boresight angles to a threshold value, each of the quadrature integration element and the azimuth angle calculator being utilized to process the monopulse scan data only if the maximum value of the quadrature angle values exceeds the threshold value.

16. The system of claim 15, further comprising a merged azimuth angle element configured to determine the first and second azimuth angle values, the merged azimuth angle element comprising:
   a multilinear regression component configured to fit the merged azimuth angle values to a cubic polynomial of the boresight angle of the monopulse radar to provide a set of polynomial coefficients; and
   a model selection component that selects one of a cubic polynomial model and a linear polynomial model according to a magnitude of a coefficient of a cubic term from the set of polynomial coefficients.

17. The system of claim 16, the linear polynomial model comprising:
   an azimuth integration component configured to integrate the merged azimuth angle values over an angular region of the monopulse scan to produce an integration value;
   a linear regression element configured to fit the merged azimuth angle values to a linear polynomial function of the boresight angles to produce a first order coefficient and a constant value;
   an azimuth angle calculator configured to determine a mean of a first azimuth angle value and a second azimuth angle value representing two closely spaced targets and a difference between the first and second azimuth angle values as a function of the first order coefficient, the constant value, and the integration value, determine a difference between the first and second azimuth angle values as a function of the first order coefficient, and determine the first and second azimuth angle values from the determined mean of the first and second azimuth angle values and difference between the first and second azimuth angle values.

18. The system of claim 16, the cubic polynomial model being configured to calculate a first azimuth angle value and a second azimuth angle value representing two closely spaced targets from the set of polynomial coefficients.

19. The system of claim 14, further comprising a multiple target extractor that determines a number of targets represented by monopulse scan data, the multiple target extractor comprising:
   a descriptive statistics generator configured to generate a mean and a variance of the merged azimuth angle values;
   a maxima detector configured to determine the number and location of local maxima within the magnitude of quadrature angle values; and
   a multiple target logic component configured to determine a number of targets represented by the monopulse scan data from the variance of the merged azimuth angle values and the number of local maxima within the magnitude of quadrature angle values.

20. The system of claim 19, wherein the multiple target logic component is configured to determine that the monopulse scan data represents one target if the variance of the merged azimuth angle values is less than a threshold value, to determine that the monopulse scan data represents more than two targets if the variance of the merged azimuth angle values exceeds the threshold value and the number of maxima within the magnitude of quadrature angle values is greater than one, and to determine that the monopulse scan data represents two targets if the variance of the merged azimuth angle values exceeds the threshold value and the number of maxima within the quadrature angle values is not greater than one.

* * * * *